Patented Feb. 28, 1939

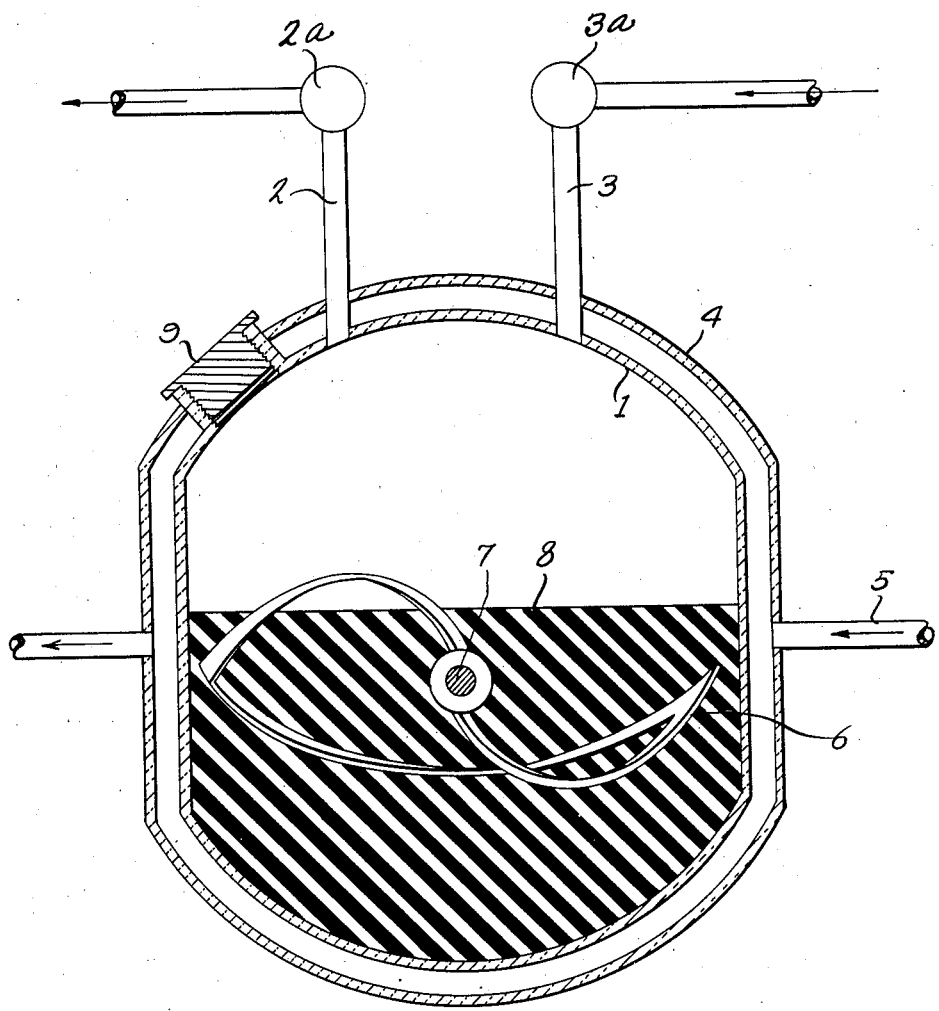

2,148,572

UNITED STATES PATENT OFFICE

2,148,572

METHOD OF TREATING RUBBER

Henry R. Minor, Dayton, Ohio, assignor to Industrial Process Corporation, Dayton, Ohio., a corporation of New York Application April 16, 1937, Serial No. 137,321

7 Claims. (Cl. 18—50)

This invention relates to a method of treating rubber and more particularly to a method of breaking down rubber and of incorporating softening agents thereinto without the necessity of prolonged milling at heavy pressures.

Heretofore, the general practice in "breaking down" or plasticizing crude rubber, and in mixing compounding ingredients therein has been to mill the rubber between rolls or in a mixer, such as the "Banbury" mixer or the "Gordon" plasticizer, for a considerable period of time until the rubber is plasticized, and then to incorporate into the plasticized rubber in the mill or mixer the various pigments, fillers, "wetting" agents, softening agents, vulcanizing agents, accelerators, anti-oxidants, and other treating agents.

The milling-in of these compounding ingredients requires considerable time, and much difficulty is encountered especially in stocks heavily loaded with pigments, such as carbon black, and toughening agents, due to scorching, blistering and dry-lapping of the stock in the mill and subsequently in the calendering or sheeting operations. Wetting or softening agents have been used along with the pigments to promote the latter's dispersion in the mix, but even with the use of such agents, the results have not been entirely satisfactory.

The quantities of carbon or gas black, for example, which may be successfully milled into a rubber stock are limited because of this tendency of the stock to scorch, blister or dry-lap in the mill and in the subsequent calendering or sheeting operations.

Furthermore, mills and mixers used for this breaking down and mixing of rubber stocks must be of a "heavy duty" type and consume much power. The large consumption of power by mills in the breaking down and mixing of rubber stocks led me to believe that it might be possible to break down or plasticize rubber by depolymerizing it at suitable heats and pressures. I have determined the temperature at which rubber is satisfactorily depolymerized, which is about 330 degrees F.

By depolymerization I mean a change and reduction in viscosity of solution. It is my theory that as a result of accomplishing depolymerization by bringing the rubber to a temperature of 330 degrees, there is a change or shifting in the equilibrium between the sol and gel phases with a consequent lowering in the degree of polymerization. The change in viscosity is an indication of this physical change.

I do not desire to be confined to any particular theory because of the difficulty of proof. I know that by the practical application of my discovery of polymerization from a predetermined degree of temperature, and the further discovery that oxygen, either supplied as oxygen or through the air, in the presence of carbon dioxide, greatly facilitates depolymerization.

I have also found that mechanical mixing, not for the purpose of masticating and breaking down the rubber but for the purpose of incorporating the carbon dioxide and oxygen mechanically in the rubber to facilitate their reaction with it, increases the satisfactory results. Carbon dioxide gas, I have discovered, is unique amongst the inert gases in that it has the capacity of penetration of the rubber under relatively low pressures. It has what might be termed "an affinity" for rubber and can impregnate it at relatively low pressures. According to my theory, the oxygen facilitates the action of the carbon dioxide and the carbon dioxide facilitates the depolymerization of the rubber.

The whole purpose of this invention practically is to improve the milling of rubber and the incorporation therein of pigments, softening agents and the like so as to eliminate scorch, blister or dry lap in the milling and in the subsequent calendering or sheeting operations. By utilizing elevated temperatures to bring about depolymerization and facilitating whatever physical change or chemical reaction that takes place by carbon dioxide and the control of the amount of air or oxygen, these results are secured without injury to the rubber due to long milling, without the expense thereof, which is very great, and with the improved results described herein.

The carbon dioxide gas impregnates the loading materials as well as the rubber, and as they are mechanically mixed with the rubber, their load of carbon dioxide gas is accordingly carried into the rubber so that the carbon dioxide gas, as well as the oxygen mixed into the rubber, facilitates the depolymerization reaction to bring it about at the earliest practicable moment with the least heat treatment of the rubber.

I prefer the elimination of any direct treatment of the rubber by steam as that tends to bring about a reversible thermal disaggregation of the hydrocarbon and has practically no effect on the globular structure.

I have now discovered that the breaking down or plasticizing of rubber may be satisfactorily carried out in the presence of carbon dioxide under elevated temperatures and pressures, preferably with controlled oxidation. Carbon dioxide acts differently from nitrogen, steam or other inert gas and is not to be considered as an equivalent of such inert gases, although in some cases I may use an inert gas.

I have further determined that various treating agents, such as softening agents which are volatile under the conditions obtaining, may be satisfactorily and efficiently dispersed throughout the body of the rubber stock by the use of carbon dioxide as a carrier and dispersing agent.

By this means much of the time and power consumed in milling operations is saved and a rubber having improved qualities and characteristics is obtained.

Furthermore, carbon dioxide has a preservative effect on the protein content of the rubber and has the added advantage over steam or other gases that it penetrates rubber more quickly and is readily absorbed or adsorbed by the rubber without introducing moisture into the rubber mass.

It is therefore an important object of this invention to provide a method for treating rubber to cause a breakdown of the rubber by subjecting the raw or crude rubber to the action of carbon dioxide gas at depolymerizing temperatures and under super atmospheric pressures.

It is a further important object of this invention to provide a method for impregnating raw rubber with softening agents by the use of carbon dioxide gas under pressure and at an elevated temperature as a carrier and impregnating agent.

A further important object of this invention is to provide a method for breaking down rubber whereby a considerable saving in time, labor and power consumption over the use of mills alone for this purpose may be realized.

Other and further important objects of this invention will become apparent from the following description and appended claims.

The drawing diagrammatically illustrates a mixer having means to control oxidation, impregnation and the temperature of the rubber.

In accordance with the present invention, raw or crude rubber is subjected to the action of carbon dioxide gas under pressures substantially higher than atmospheric and at elevated temperatures for a sufficient period of time to soften or depolymerize the rubber. As a result of this treatment, the stock is effectively broken down or plasticized and may be more easily milled and mixed with the compounding ingredients in a comparatively shorter time and with much less consumption of power.

Where softening agents are to be incorporated into rubber, this may be done more efficiently by my method by adding the softening agents, which are volatile under the conditions obtaining, to the raw rubber, without any substantial mixing, before subjecting the rubber mass to the carbon dioxide treatment. In this way, the carbon dioxide acts as a carrier and penetrating agent to disperse the softening agents, and the like, throughout the mass of the rubber and thus save subsequent consumption of power in the milling step. Furthermore, the preliminary introduction of the treating agents, and the like, into the rubber mass with the use of carbon dioxide as a carrier results in a rubber stock having superior qualities, greater tensile strength and greater uniformity.

In carrying out my invention, the raw rubber may suitably be in sheet form or may be cut into pieces of convenient size and enclosed in the vessel 1 from which the air may or may not have been evacuated through the pipe 2. Carbon dioxide is then introduced into the vessel through the pipe 3 and is maintained in the vessel at a pressure of between 25 and 100 lbs. per sq. in., and preferably at about 50 lbs. per sq. in. Pressures in excess of 100 lbs. per sq. in. give no especial added advantage.

The vessel may be heated, as by steam jacketed walls 4, to a temperature equivalent to that of steam at 100 lbs. per sq. in. pressure and over, viz. to temperatures in excess of about 330 degrees F. Steam is supplied through the pipe 5. The rubber is mixed by the mixer 6 which is suitably driven by the shaft 7. The rubber 8 is mixed in the presence of air remaining within the autoclave and with the carbon dioxide gas within the autoclave. Softening agents can be incorporated at the same time if desired. The valves 2a and 3a respectively control the air line and the carbon dioxide line. Thus oxidation is controlled during mixing. Access to the autoclave is gained through the door 9 for the introduction of any materials into the autoclave. As hereinafter described, the control of the amount of oxidation depends upon the amount of air present and the replacing of that air by carbon dioxide gas.

Temperatures sufficiently high to depolymerize the rubber under normal atmospheric conditions should be used for a period long enough to break down or plasticize the rubber. Actually, under the conditions obtaining, no substantial depolymerization of the rubber may take place, owing to the carbon dioxide pressure. The pressures, temperatures and times employed may be varied, as will be understood by skilled artisans, but a pressure of 50 lbs. per sq. in., a temperature of 330 to 350 degrees F. and a heating period of two to three hours have been used successfully. In general, the temperatures employed in my process are higher than those normally employed in the vulcanization of rubber compounds.

Various wetting and softening agents which are liquid and/or volatile under the conditions obtaining may be incorporated into the rubber stock by the use of carbon dioxide as a carrier. Among the various wetting agents and rubber softening agents, generically termed "treating agents", may be mentioned oleic acid, pine tar, stearic acid, "Plastogen", acetic acid, and others. These are introduced in quantities equal to approximately 2 to 8 per cent by weight of the rubber stock. Where the treating agents employed are liquid, they may be poured over the surface of the rubber in the proper proportion either before or after the rubber has been introduced into the pressure vessel.

*Breaking down rubber with controlled oxidation*

I have discovered that depolymerization of rubber can be employed for the purpose of controlling the breaking down of rubber. This is facilitated when performed in the presence of carbon dioxide gas with controlled oxidation. I find that by regulating the amount of air within the autoclave and by replacing that air with carbon dioxide gas, I am enabled to secure the oxidation. I prefer to evacuate only a portion of the air and to replace the portion of air so evacuated with carbon dioxide gas. This is performed by regulating the valves 2a and 3a which are respectively used to control the amount of air evacuated through the air pipe 2 and the amount of carbon dioxide gas admitted through the gas pipe 3.

I find that by the regulation of heat and pressure with controlled oxidation, I can control the depolymerization of rubber, which takes place at approximately 330 degrees Fahrenheit, its depolymerizing temperature. My invention is based upon the discovery that by bringing the rubber to the depolymerizing temperature, it can be broken down to effect the savings recited herein.

This is contrary to the previous impression that the breaking down of the rubber should be done at low temperatures, for which purpose breaking rolls and other devices were water cooled. I find to the contrary that by bringing the rubber to depolymerizing temperatures, I am enabled not only to break down the rubber economically without destroying its properties but I am enabled to improve the rubber's physical property and to incorporate treating agents with the rubber in an improved manner.

Thus the method of my invention has these phases:

(a) The breaking down of rubber under depolymerizing temperatures.

(b) The breaking down of rubber in the presence of carbon dioxide under elevated temperatures and pressures.

(c) The breaking down of rubber with controlled oxidation in the presence of carbon dioxide under elevated temperatures and pressures.

While, in general, it is preferable in connection with the incorporation of wetting and softening agents into the rubber to use the same temperatures, pressures and times as were specified in the method of plasticizing the rubber described above, lower temperatures may be employed so long as they result in the volatilization of the treating agent, but the full plasticizing effect of the carbon dioxide may not be realized at temperatures below the depolymerizing temperature.

The carbon dioxide under pressure during the heat treatment of the rubber picks up the softening agent and, in penetrating the rubber mass, apparently carries with it the volatilized treating agent.

Then, upon release of the pressure, the treating ingredients remain behind substantially uniformly dispersed throughout the rubber mass, while the carbon dioxide is given off. The attraction of the rubber particles for these treating agents is apparently greater than the attraction of the carbon dioxide for the treating agents. It may be that the treating agents are actually condensed upon the surfaces of the rubber particles.

Where test specimens have been made up from rubber treated in accordance with my invention and compared with specimens made up in the usual fashion, it has been found that the time heretofore required to incorporate treating ingredients into the rubber stock on the mill has been entirely eliminated. Furthermore, for example, a specimen in which 2 per cent of pine tar was added in the mill in the customary fashion gave a tensile strength of 4055 lbs. per sq. in. and an elongation of 665 per cent, whereas when the pine tar was incorporated by my method, the tensile strength under identical conditions was 4440 lbs. per sq. in. and the elongation 660 per cent, indicating a substantial improvement in tensile strength without any decrease in elongation. There is thus a very considerable improvement in the product as well as a reduction in the milling time.

Raw rubber, which has been plasticized by my process requires no milling other than the mere sheeting out of the material, such as is done anyway on pre-masticated rubber. Important economies are thus effected by the use of my process.

This application is a continuation in part of my previous application Ser. No. 719,301, filed April 6, 1934.

It will be understood that I desire to comprehend within my invention such modifications as may be clearly embraced within the claims and scope of my invention.

Having thus fully described my invention, what I claim as new and desire to secure by Letters Patent, is:

1. The process of treating rubber to break it down comprising the steps of placing rubber in a vessel filled with a gas containing oxygen, closing the vessel to prevent the escape of said gas therefrom, introducing a regulated amount of carbon dioxide into the vessel to control the oxidation of the rubber, and heating the rubber in the vessel to a temperature of at least 330° F.

2. The process of treating rubber to break it down comprising the steps of placing rubber in a vessel filled with air, closing the vessel to prevent the escape of said air therefrom, introducing a regulated amount of carbon dioxide into the vessel to control the oxidation of the rubber, and heating the rubber in the vessel to a temperature of at least 330° F.

3. The process of treating rubber to break it down comprising the steps of placing rubber in a vessel filled with a gas containing oxygen, closing the vessel to prevent the escape of said gas therefrom, introducing an inert gas into the vessel to control the oxidation of the rubber, and heating the rubber in the vessel to a temperature of at least 330° F.

4. The process of treating rubber to break it down comprising the steps of placing rubber in a vessel filled with air, closing the vessel evacuating the air from the vessel and introducing a regulated amount of carbon dioxide to take the place of the air thus evacuated, subjecting the rubber to superatmospheric pressures by the introduction of additional amounts of carbon dioxide to control the oxidation of the rubber and heating the rubber in the vessel to a temperature of at least 330° F.

5. The process of treating rubber to break it down comprising the steps of placing rubber in a vessel filled with air, closing the vessel to prevent the escape of air therefrom and introducing a regulated amount of carbon dioxide to a pressure of between 25 and 100 lbs. per square inch in the vessel to control the oxidation of the rubber and heating the rubber in the vessel to a temperature of at least 330° F.

6. The process of treating rubber to break it down comprising the steps of placing rubber in a vessel filled with air closing the vessel to prevent the escape of air therefrom introducing a regulated amount of an inert gas to said vessel and evacuating at least a part of the air within said vessel to control the oxidation of the rubber and heating the rubber in the vessel to at least a temperature of 330° F.

7. The process of treating rubber to break it down comprising the steps of placing rubber in a vessel filled with a gas containing oxygen closing the vessel, evacuating at least a part of said oxygen from said vessel and introducing regulated amounts of an inert gas into said vessel to control the oxidation of the rubber and heating the rubber in the vessel to a temperature of about 330° F.

HENRY R. MINOR.